(12) United States Patent
Okada et al.

(10) Patent No.: US 11,256,933 B2
(45) Date of Patent: Feb. 22, 2022

(54) IMAGE PROCESSING DEVICE AND IMAGE PROCESSING METHOD

(71) Applicant: DENSO TEN Limited, Kobe (JP)

(72) Inventors: Yasutaka Okada, Kobe (JP); Hiroaki Sano, Kobe (JP); Tetsuo Yamamoto, Kobe (JP); Atsushi Yoshihara, Kobe (JP); Jun Kanetake, Kawasaki (JP); Ryo Yoshimura, Fukuoka (JP); Tomoki Shidori, Kobe (JP)

(73) Assignee: DENSO TEN Limited, Kobe (JP)

( * ) Notice: Subject to any disclaimer, the term of this patent is extended or adjusted under 35 U.S.C. 154(b) by 259 days.

(21) Appl. No.: 16/574,450

(22) Filed: Sep. 18, 2019

(65) Prior Publication Data
US 2020/0193187 A1 Jun. 18, 2020

(30) Foreign Application Priority Data
Dec. 14, 2018 (JP) .............................. JP2018-234805

(51) Int. Cl.
*G06K 9/00* (2006.01)
*G06K 9/46* (2006.01)
*G06K 9/20* (2006.01)

(52) U.S. Cl.
CPC ....... *G06K 9/00812* (2013.01); *G06K 9/2063* (2013.01); *G06K 9/4604* (2013.01)

(58) Field of Classification Search
CPC .. B60W 30/06; B60W 10/20; B60W 2552/53; B60W 2420/42; B60W 2552/05;
(Continued)

(56) References Cited

U.S. PATENT DOCUMENTS 5,947,635 A * 9/1999 Wilson, Sr. ............. E01F 9/512
404/72
7,706,944 B2 * 4/2010 Tanaka ............... B62D 15/0275
701/41
(Continued)

FOREIGN PATENT DOCUMENTS

CN 203318408 U 12/2013
CN 102834309 B 12/2016
(Continued)

OTHER PUBLICATIONS

Zhang et al. "Vision-Based Parking-Slot Detection: A DCNN-Based Approach and a Large-Scale Benchmark Dataset" 9pp. 5350-5364) (Year: 2018).*
(Continued)

*Primary Examiner* — Manav Seth
(74) *Attorney, Agent, or Firm* — Oliff PLC

(57) ABSTRACT

An image processing device includes: a delimiting line detection unit configured to detect a delimiting line candidate based on image data obtained by capturing a surrounding of a vehicle; an exclusion determination unit configured to determine whether there is a parking-unavailable area in which parking of the vehicle is not permitted; and a parking space detection unit configured to detect the parking space based on the delimiting line candidate. In a case where plural parallel lines that are adjacent to the delimiting line candidate and that have a predetermined angle to the delimiting line candidate is detected, the exclusion determination unit regards an area in which the plural parallel lines are provided as the parking-unavailable area, and prohibits the parking space detection unit from detecting the parking space across the delimiting line candidate adjacent to the parking-unavailable area.

13 Claims, 5 Drawing Sheets

(58) Field of Classification Search
CPC .............. B62D 15/0285; B62D 15/027; B62D 15/028; G06K 9/00812; G06K 9/00798; G06K 9/4604; G06K 9/3233; G06K 2009/3225; G06K 9/2063; G08G 1/168; G08G 1/146; G08G 1/14; G08G 1/147; G08G 1/065; G08G 1/141; G08G 1/148; G06T 2207/30264; G06T 2207/30256

See application file for complete search history.

(56) References Cited

U.S. PATENT DOCUMENTS

| | | | | |
|---|---|---|---|---|
| 7,812,741 | B2* | 10/2010 | Sakakibara | B62D 15/0275 340/932.2 |
| 7,893,847 | B2* | 2/2011 | Shanbhag | G08G 1/14 340/932.2 |
| 8,144,031 | B2* | 3/2012 | Kawabata | B62D 15/028 340/908 |
| 8,154,426 | B2* | 4/2012 | Endo | G08G 1/168 340/932.2 |
| 8,275,173 | B2* | 9/2012 | Wu | G08G 1/168 382/104 |
| 8,300,889 | B2* | 10/2012 | Jung | G06K 9/00798 382/103 |
| 8,319,663 | B2* | 11/2012 | Reyher | G08G 1/165 340/932.2 |
| 8,957,787 | B1* | 2/2015 | Al-Hmalan | G08G 1/149 340/932.2 |
| 8,988,250 | B2* | 3/2015 | Suzuki | B62D 15/027 340/932.2 |
| 9,275,297 | B2* | 3/2016 | Tabb | G06K 9/4633 |
| 9,361,529 | B2* | 6/2016 | Ryu | G06K 9/00812 |
| 9,467,645 | B2* | 10/2016 | Yoon | G08G 1/143 |
| 9,536,155 | B2 | 1/2017 | Takemae | |
| 9,721,460 | B2 | 8/2017 | Takemura et al. | |
| 9,773,413 | B1* | 9/2017 | Li | G08G 1/144 |
| 10,025,997 | B2* | 7/2018 | Han | B62D 15/0285 |
| 10,160,462 | B2* | 12/2018 | Ohta | B60W 10/184 |
| 10,163,016 | B2* | 12/2018 | Hayakawa | G08G 1/143 |
| 10,311,731 | B1* | 6/2019 | Li | G08G 1/146 |
| 10,373,226 | B1* | 8/2019 | Russell | G06Q 30/0613 |
| 10,449,955 | B2* | 10/2019 | Kim | B60W 50/14 |
| 10,583,829 | B2* | 3/2020 | Kim | B60W 50/082 |
| 10,713,509 | B1* | 7/2020 | Lei | B60R 1/00 |
| 10,796,172 | B2* | 10/2020 | Okada | G06K 9/56 |
| 10,930,156 | B2* | 2/2021 | Hayashi | B62D 15/029 |
| 11,104,328 | B2* | 8/2021 | Suzuki | B60W 40/09 |
| 2002/0087253 | A1 | 7/2002 | Jeon | |
| 2003/0128106 | A1 | 7/2003 | Ross | |
| 2003/0222983 | A1 | 12/2003 | Nobori et al. | |
| 2004/0254720 | A1 | 12/2004 | Tanaka et al. | |
| 2006/0080035 | A1 | 4/2006 | Daubert et al. | |
| 2008/0109120 | A1 | 5/2008 | Sawamoto | |
| 2009/0243889 | A1 | 10/2009 | Suhr et al. | |
| 2009/0278709 | A1 | 11/2009 | Endo et al. | |
| 2010/0049402 | A1 | 2/2010 | Tanaka | |
| 2010/0195901 | A1 | 8/2010 | Andrus et al. | |
| 2010/0318467 | A1 | 12/2010 | Porter et al. | |
| 2011/0006917 | A1 | 1/2011 | Taniguchi et al. | |
| 2012/0106802 | A1 | 5/2012 | Hsieh et al. | |
| 2013/0027557 | A1 | 1/2013 | Hirai et al. | |
| 2013/0266188 | A1 | 10/2013 | Bulan et al. | |
| 2014/0355822 | A1 | 12/2014 | Choi et al. | |
| 2015/0130640 | A1 | 5/2015 | Ryu et al. | |
| 2015/0254981 | A1 | 9/2015 | Tachibana et al. | |
| 2015/0294163 | A1 | 10/2015 | Sakamoto | |
| 2015/0317526 | A1 | 11/2015 | Muramatsu et al. | |
| 2015/0344028 | A1 | 12/2015 | Gieseke et al. | |
| 2016/0039409 | A1 | 2/2016 | Hayakawa et al. | |
| 2016/0093214 | A1 | 3/2016 | Wu et al. | |
| 2016/0107689 | A1 | 4/2016 | Lee | |
| 2016/0272244 | A1 | 9/2016 | Imai et al. | |
| 2016/0304088 | A1 | 10/2016 | Barth | |
| 2017/0032681 | A1 | 2/2017 | Tomozawa et al. | |
| 2017/0085790 | A1 | 3/2017 | Bohn | |
| 2018/0012082 | A1 | 1/2018 | Satazoda et al. | |
| 2018/0095474 | A1 | 4/2018 | Batur et al. | |
| 2018/0099661 | A1 | 4/2018 | Bae et al. | |
| 2018/0162446 | A1 | 6/2018 | Mikuriya et al. | |
| 2018/0215413 | A1 | 8/2018 | Inagaki | |
| 2018/0307919 | A1 | 10/2018 | Hayakawa | |
| 2018/0307922 | A1 | 10/2018 | Yoon et al. | |
| 2018/0345955 | A1* | 12/2018 | Kim | B60W 30/06 |
| 2019/0073902 | A1 | 3/2019 | Indoh et al. | |
| 2019/0075255 | A1 | 3/2019 | Matsumoto et al. | |
| 2019/0094871 | A1 | 3/2019 | Sugano | |
| 2019/0370572 | A1* | 12/2019 | Nagpal | G06T 7/62 |
| 2019/0392229 | A1* | 12/2019 | Yamamoto | G08G 1/168 |
| 2020/0062242 | A1 | 2/2020 | Hayakawa | |
| 2020/0074192 | A1 | 3/2020 | Ogata et al. | |
| 2020/0104613 | A1* | 4/2020 | Hirai | G06K 9/50 |
| 2020/0117927 | A1 | 4/2020 | Oba | |
| 2020/0118310 | A1 | 4/2020 | Matsumoto et al. | |
| 2020/0175634 | A1 | 6/2020 | Aggarwala et al. | |
| 2020/0193184 | A1* | 6/2020 | Okada | G06K 9/4676 |
| 2020/0193185 | A1* | 6/2020 | Okada | G06K 9/00812 |
| 2020/0193643 | A1 | 6/2020 | Hess et al. | |
| 2020/0398827 | A1 | 12/2020 | Hara | |
| 2021/0180954 | A1 | 6/2021 | Hiyokawa et al. | |

FOREIGN PATENT DOCUMENTS

| | | |
|---|---|---|
| JP | 2003-032669 A | 1/2003 |
| JP | 2005-300294 A | 10/2005 |
| JP | 2009-288867 A | 12/2009 |
| JP | 2012-176641 A | 9/2012 |
| JP | 2012-221375 A | 11/2012 |
| JP | 2013-001366 A | 1/2013 |
| JP | 2014-106731 A | 6/2014 |
| JP | 2014-146182 A | 8/2014 |
| JP | 2015-104982 A | 6/2015 |
| JP | 2015-185138 A | 10/2015 |
| JP | 2015219774 A | 12/2015 |
| JP | 2017-021747 A | 1/2017 |
| JP | 2017-076275 A | 4/2017 |
| JP | 2017-087758 A | 5/2017 |
| JP | 2018-136695 A | 8/2018 |
| JP | 2018-180941 A | 11/2018 |
| KR | 20170102192 A | 9/2017 |
| WO | 03058163 A1 | 7/2003 |
| WO | 2005/081941 A2 | 9/2005 |
| WO | 2010116922 A1 | 10/2010 |
| WO | 2014/084118 A1 | 6/2014 |
| WO | 2017/068699 A1 | 4/2017 |

OTHER PUBLICATIONS

Jun. 30, 2020 Notice of Allowance issued in U.S. Appl. No. 16/574,546.
Mar. 30, 2021 Office Action issued in U.S. Appl. No. 16/574,516.
Mar. 19, 2021 Office Action issued in U.S. Appl. No. 16/574,462.
Mar. 19, 2021 Office Action issued in U.S. Appl. No. 16/574,503.
Mar. 25, 2021 Office Action issued in U.S. Appl. No. 16/574,391.
Apr. 9, 2021 Office Action issued in U.S. Appl. No. 16/574,393.
Apr. 6, 2021 Office Action issued in U.S. Appl. No. 16/574,507.
Nov. 23, 2020 Office Action issued in U.S. Appl. No. 16/574,462.
K Choeychuen, "Available car parking space detection from webcam by using adaptive mixing features," 2012 Ninth International Joint Conference on Computer Science and Software Engineering (JCSSE) (Year: 2012).
Nov. 30, 2020 Office Action issued in U.S. Appl. No. 16/574,503.
Suhr et al., "Automatic Parking Space Detection and Tracking for Underground and Indoor Environments." IEEE Transactions on Industrial Electronics. (Year: 2016).
K Hamada et al., "Surround View Based Parking Lot Detection and Tracking." IEEE Intelligent Vehicles Symposium. (Year 2015) pp. 1106-1111.
Dec. 3, 2020 Office Action issued in U.S. Appl. No. 16/574,393.
J Suhr et al., "A Universal Vacant Parking Slot Recognition System Using Sensors Mounted on Off-the-Shelf Vehicles." (Year 2018).

(56) References Cited

OTHER PUBLICATIONS

Jul. 20, 2021 Notice of Allowance issued in U.S. Appl. No. 16/574,507.
Sep. 29, 2020 U.S. Office Action issued U.S. Appl. No. 16/574,391.
May 19, 2021 Office Action issued in U.S. Appl. No. 16/574,395.
Reinhard et al., Photographic Tone Reproduction for Digital Images (2002), ACM Transactions on Graphics, 2, 4, 217-236 (Year: 2002).
Feb. 2, 2021 Office Action issued in U.S. Appl. No. 16/574,422.
Aug. 3, 2020 Office Action issued in U.S. Appl. No. 16/574,598.
Jun. 24, 2021 Notice of Allowance issued in U.S. Appl. No. 16/574,499.
Jul. 13, 2021 Notice of Allowance issued in U.S. Appl. No. 16/574,516.
U.S. Appl. No. 16/574,395, filed Sep. 18, 2019 in the name of Yasutaka Okada et al.
U.S. Appl. No. 16/574,507, filed Sep. 18, 2019 in the name of Yasutaka Okada et al.
U.S. Appl. No. 16/574,462, filed Sep. 18, 2019 in the name of Yasutaka Okada et al.
U.S. Appl. No. 16/574,422, filed Sep. 18, 2019 in the name of Yasutaka Okada et al.
U.S. Appl. No. 16/574,598, filed Sep. 18, 2019 in the name of Yasutaka Okada et al.
U.S. Appl. No. 16/574,503, filed Sep. 18, 2019 in the name of Yasutaka Okada et al.
U.S. Appl. No. 16/574,499, filed Sep. 18, 2019 in the name of Yasutaka Okada et al.
U.S. Appl. No. 16/574,529, filed Sep. 18, 2019 in the name of Yasutaka Okada et al.
U.S. Appl. No. 16/574,546, filed Sep. 18, 2019 in the name of Yasutaka Okada et al.
U.S. Appl. No. 16/574,393, filed Sep. 18, 2019 in the name of Yasutaka Okada et al.
U.S. Appl. No. 16/574,391, filed Sep. 18, 2019 in the name of Yasutaka Okada et al.
U.S. Appl. No. 16/574,516, filed Sep. 18, 2019 in the name of Yasutaka Okada et al.

\* cited by examiner

IMAGE PROCESSING DEVICE AND IMAGE PROCESSING METHOD

CROSS-REFERENCE TO RELATED APPLICATIONS

This application is based upon and claims the benefit of priority from prior Japanese patent application No. 2018-234805, filed on Dec. 14, 2018, the entire contents of which are incorporated herein by reference.

BACKGROUND

Technical Field

The present disclosure relates to an image processing device and an image processing method.

Related Art

In recent years, as automatic driving technology is developed, an image processing device configured to detect a parking space for parking a vehicle from image data obtained by capturing a surrounding of the vehicle is spread. In the image processing device, delimiting lines for delimiting the parking space are detected from the captured data, and the parking space is detected on the basis of the detected delimiting lines (for example, refer to JP-A-2017-87758).

SUMMARY

However, in the related art, for example, when a stripe area indicative of a parking-unavailable area is drawn between a pair of delimiting lines, a parking space across the stripe area may be falsely detected, based on the pair of delimiting lines.

The present disclosure has been made in view of the above situation, and an object thereof is to provide an image processing device and an image processing method capable of suppressing detection of a false parking space across a stripe area.

According to an aspect of the present disclosure, there is provided an image processing device including: a delimiting line detection unit configured to detect a delimiting line candidate based on image data obtained by capturing a surrounding of a vehicle; an exclusion determination unit configured to determine whether there is a parking-unavailable area in which parking of the vehicle is not permitted; and a parking space detection unit configured to detect the parking space based on the delimiting line candidate. In a case where plural parallel lines that are adjacent to the delimiting line candidate and that have a predetermined angle to the delimiting line candidate is detected, the exclusion determination unit regards an area in which the plural parallel lines are provided as the parking-unavailable area, and prohibits the parking space detection unit from detecting the parking space across the delimiting line candidate adjacent to the parking-unavailable area.

According to the present disclosure, it may be possible to suppress detection of the false parking space across the stripe area.

BRIEF DESCRIPTION OF DRAWINGS

Exemplary embodiment(s) of the present invention will be described in detail based on the following figures, wherein.

DETAILED DESCRIPTION

Hereinbelow, an exemplary embodiment of the image processing device and the image processing method according to the present disclosure will be described in detail with reference to the accompanying drawings. In the meantime, the present disclosure is not limited to the exemplary embodiment.

<Outline of Image Processing Device>

Figure 1A:
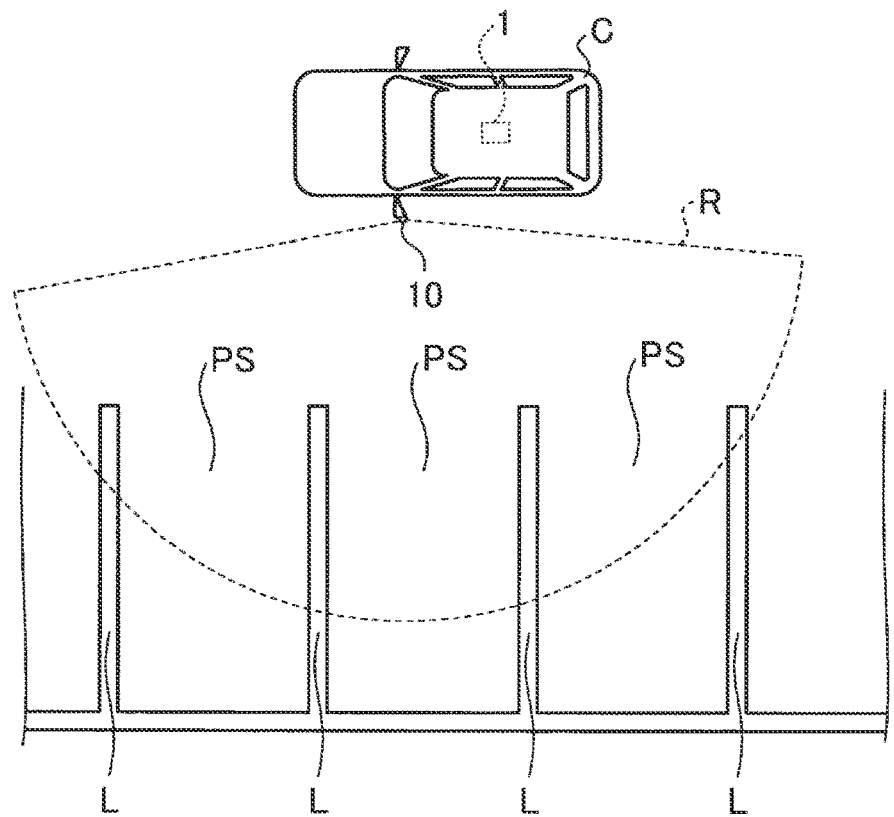
FIG. 1A depicts an example in which an image processing device of an exemplary embodiment is mounted.
Figure 1B:
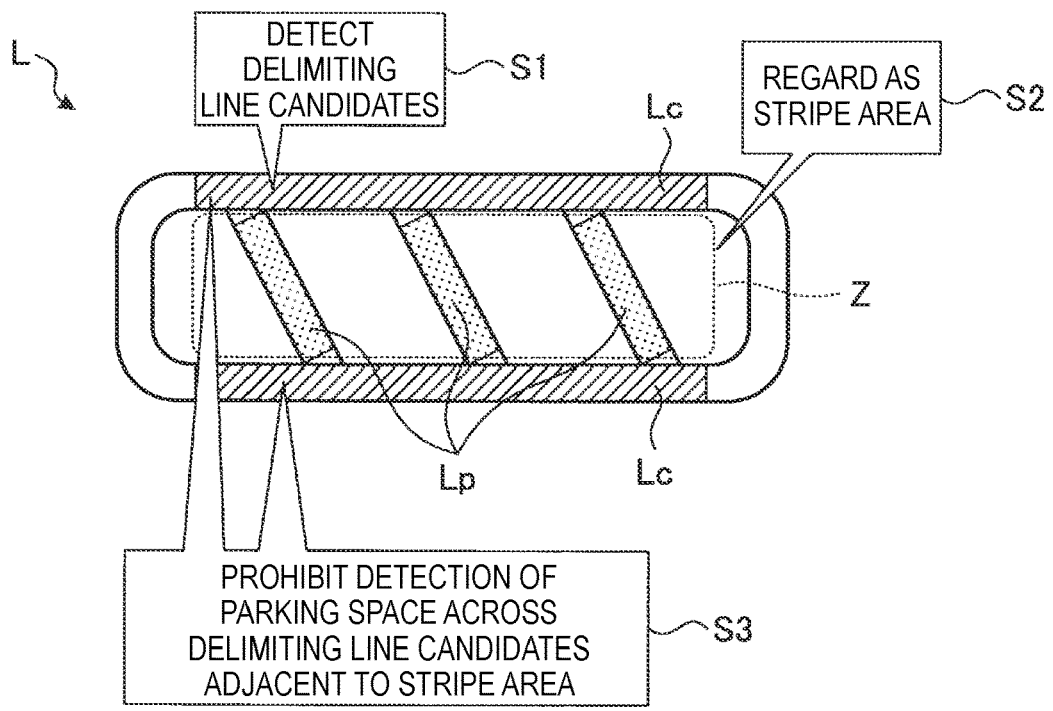
FIG. 1B illustrates details of an image processing method of the exemplary embodiment.

First, an outline of an image processing device according to an exemplary embodiment is described with reference to FIGS. 1A and 1B. FIG. 1A depicts an example in which an image processing device 1 is mounted. Also, FIG. 1B illustrates details of an image processing method of the exemplary embodiment. The image processing method is executed by the image processing device 1 shown in FIG. 2.

As shown in FIG. 1A, the image processing device 1 according to the exemplary embodiment is mounted on a vehicle C, and is configured to detect delimiting lines L from captured data captured by a vehicle-mounted camera 10 and to detect parking spaces PS from the delimiting lines L.

The vehicle-mounted camera 10 includes an imaging element such as a CCD (Charge Coupled Device), a CMOS (Complementary Metal Oxide Semiconductor) and the like, for example, and is configured to capture a surrounding of the vehicle C. Also, a lens of the vehicle-mounted camera 10, for which a wide-angle lens such as a fish-eye lens is adopted, for example, has an imaging area R as shown in FIG. 1A.

Meanwhile, in the example of FIG. 1A, the vehicle-mounted camera 10 is a left side camera configured to capture a left side of the vehicle C. However, the vehicle-mounted camera 10 includes a front camera configured to capture a front of the vehicle C, a rear camera configured to capture a rear of the vehicle C, a right side camera configured to capture a right side of the vehicle C, and the like.

When detecting the parking spaces PS, the image processing device 1 detects delimiting line candidates Lc (refer to FIG. 1B), which are candidates of the delimiting line L for delimiting each parking space PS, and detects the parking spaces PS on the basis of the detected delimiting line candidates Lc.

However, for example, when a stripe area indicative of a parking-unavailable area is drawn between a pair of delimiting line candidates Lc, a parking space PS across the stripe area may be falsely detected, based on the pair of delimiting line candidates Lc.

Therefore, the image processing device 1 according to the exemplary embodiment is configured to suppress detection of a false parking space PS across the stripe area.

Specifically, as shown in FIG. 1B, the image processing device 1 detects first the delimiting line candidates Lc from the captured data (step S1). For example, the image processing device 1 detects the delimiting line candidates Lc, based on edge lines connecting edge points obtained by performing edge emphasizing for the captured data.

In the following drawings, for easy understanding, the descriptions are made on the basis of the drawings obtained by converting the captured data into bird's eye views. Also, FIG. 1B depicts an example in which the delimiting line L has an oblong shape, as a whole, and a plurality of parallel lines is drawn in the oblong shape.

As shown in FIG. 1B, when a plurality of parallel lines Lp adjacent to the delimiting line candidates Lc and having a predetermined angle to the delimiting line candidates Lc is detected, the image processing device 1 regards an area in which the plurality of parallel lines Lp is provided, as a stripe area Z (step S2).

In the meantime, the predetermined angle of the plurality of parallel lines Lp to the delimiting line candidates Lc is an angle greater than 0° and equal to or smaller than 90°.

In processing of detecting the parking space PS, the image processing device 1 prohibits detection of the parking space PS across the delimiting line candidates Lc adjacent to the stripe area Z (step S3). That is, the image processing device 1 sets, as a parking-unavailable area, an inside of the two delimiting line candidates Lc adjacent to the stripe area Z.

Thereby, the image processing device 1 can suppress detection of the false parking space PS across the stripe area Z.

Also, in the processing of detecting the parking space PS, the image processing device 1 may prohibit detection of the parking space PS across the stripe area Z. That is, an inside of the stripe area Z may be set as a parking-unavailable area.

Thereby, the image processing device 1 can further suppress detection of the false parking space PS across the stripe area Z.

Also, when the three or more parallel lines Lp adjacent to the delimiting line candidates Lc and having a predetermined angle to the delimiting line candidates Lc are detected, the image processing device 1 may regard an in which the three or more parallel lines Lp are provided, as the stripe area Z. The reason is that the stripe area is generally formed by three or more parallel lines Lp. Thereby, it is possible to suppress an area in which a pair of parallel delimiting line candidates Lc is provided from being falsely regarded as the stripe area Z.

That is, the area in which the three or more parallel lines Lp are provided is regarded as the stripe area Z, so that it is possible to suppress the stripe area Z from being falsely recognized.

<Configuration Example of Image Processing Device>

Figure 2:
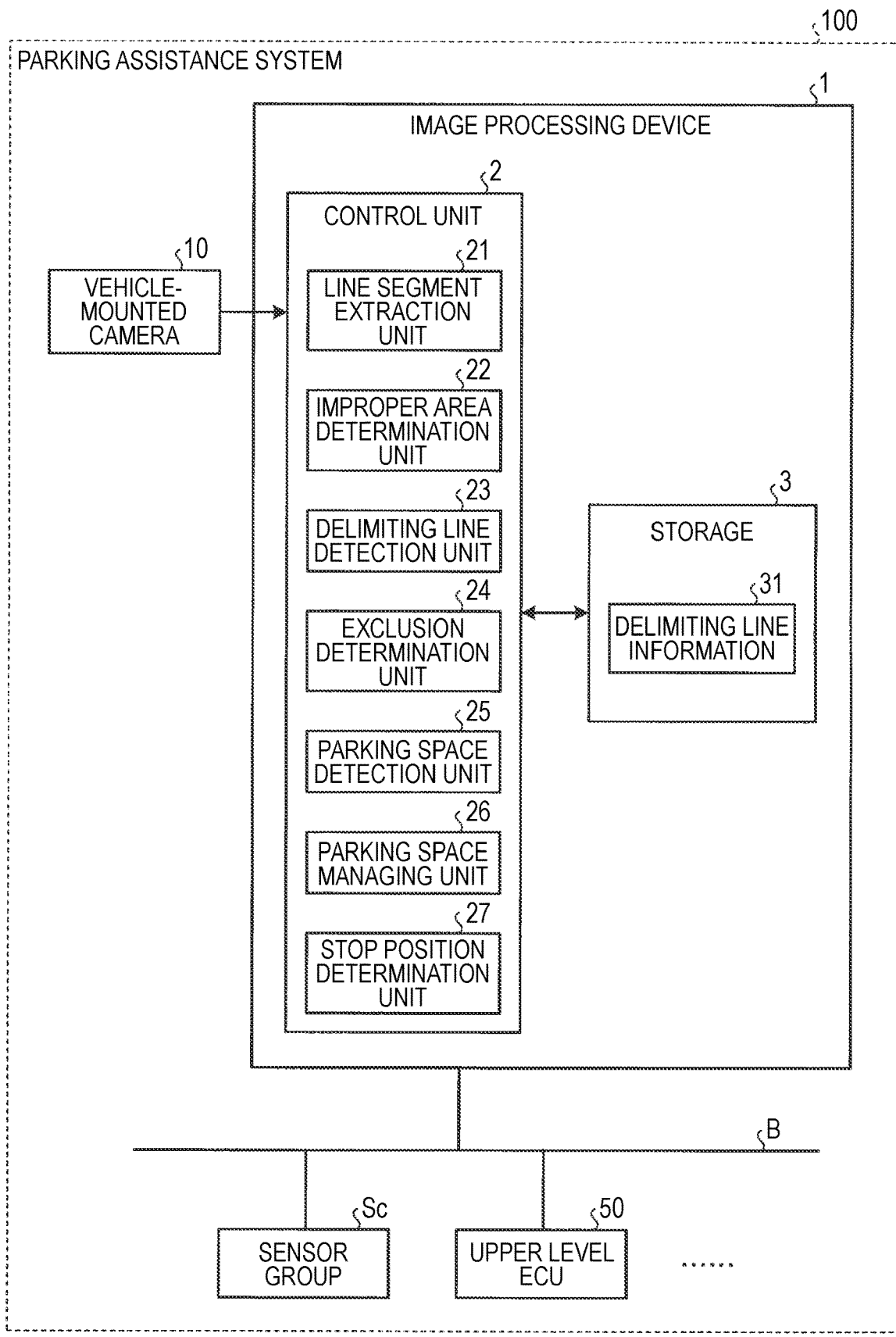
FIG. 2 is a block diagram depicting a configuration of a parking assistance system of the exemplary embodiment.

Subsequently, a configuration example of the image processing device 1 according to the exemplary embodiment is described with reference to FIG. 2. FIG. 2 is a block diagram of the image processing device 1. In the meantime, FIG. 2 depicts a parking assistance system 100 including the image processing device 1.

As shown in FIG. 2, the parking assistance system 100 includes the image processing device 1, the vehicle-mounted camera 10, a sensor group Sc, and an upper level ECU (Electronic Control Unit) 50. Also, as shown in FIG. 2, the image processing device 1, the sensor group Sc and the upper level ECU 50 can perform communication with one another via a communication bus B of communication protocols of CAN (Control Area Network) communication.

The sensor group Sc includes a variety of sensors configured to detect a traveling state of the vehicle C (refer to FIG. 1A), and is configured to notify detected sensor values to the image processing device 1. The sensor group Sc includes a vehicle speed sensor configured to detect the number of rotations of a wheel of the vehicle C, a steering angle sensor configured to detect a steering angle of the vehicle C, and the like.

The upper level ECU 50 is an ECU configured to support automatic parking of the vehicle C, for example, and is configured to control such that the vehicle C is parked in the parking space PS, based on the parking space PS detected by the image processing device 1, for example.

For example, the upper level ECU 50 is an EPS (Electric Power Steering)-ECU configured to control the steering angle of the vehicle C, and can control the steering angle relative to the parking space PS detected by the image processing device 1. In the meantime, the upper level ECU 50 may include an ECU configured to perform accelerator control and brake control.

As shown in FIG. 2, the image processing device 1 includes a control unit 2 and a storage 3. The control unit 2 includes a line segment extraction unit 21, an improper area determination unit 22, a delimiting line detection unit 23, an exclusion determination unit 24, a parking space detection unit 25, a parking space managing unit 26, and a stop position determination unit 27. The storage 3 has delimiting line information 31.

The control unit 2 includes a computer having, for example, a CPU (Central Processing Unit), a ROM (Read Only Memory), a RAM (Random Access Memory), an HDD (Hard Disk Drive), an I/O port, and the like, and a variety of circuits.

The CPU of the computer is configured to read and execute programs stored in the ROM, thereby functioning as the line segment extraction unit 21, the improper area determination unit 22, the delimiting line detection unit 23, the exclusion determination unit 24, the parking space detection unit 25, the parking space managing unit 26 and the stop position determination unit 27 of the control unit 2.

Also, at least some or all of the line segment extraction unit 21, the improper area determination unit 22, the delimiting line detection unit 23, the exclusion determination unit 24, the parking space detection unit 25, the parking space managing unit 26 and the stop position determination unit 27 of the control unit 2 may be configured by hardware such as an ASIC (Application Specific Integrated Circuit), an FPGA (Field Programmable Gate Array) and the like.

When it is assumed that the vehicle C travels in the parking lot (for example, the vehicle speed is lower than 30 km/h), for example, the control unit 2 may execute detection processing of the parking space PS, which will be described later, or may execute the detection processing all during the traveling of the vehicle C.

The line segment extraction unit 21 is configured to detect edge lines connecting edge points based on luminance of each pixel, from the image data input from the vehicle-mounted camera 10. Specifically, the line segment extraction unit 21 converts the image data input from the vehicle-mounted camera 10 into a gray scale image by performing gray scaling for the image data. The gray scaling is processing of converting each pixel of image data so as to express the same with each gradation (for example, 256 gradations) from white to black, in correspondence to luminance.

The line segment extraction unit 21 may obtain an edge strength of each pixel and a luminance gradient by applying a Sobel filter to the gray scale image, for example. Then, the line segment extraction unit 21 may extract the edge points by extracting pixels having edge strength exceeding a predetermined value, and may extract the edge lines by connecting the adjacent edge points. The line segment extraction unit 21 is configured to notify edge information about the extracted edge points and edge lines to the improper area determination unit 22.

The improper area determination unit 22 is configured to determine whether there is an improper area in which it is difficult to detect the delimiting line L for establishing the parking space PS, based on the edge points and edge lines extracted by the line segment extraction unit 21. For example, the improper area determination unit 22 may determine, as the improper area, a non-paved road surface area (for example, gravels) and a grating area, in which more edge points are extracted, as compared to a paved road surface.

Specifically, the improper area determination unit 22 may determine, as the improper area, an area in which a density of the respective edge points is equal to or greater than a predetermined value and the luminance gradient of the respective edge points is not uniform. The improper area determination unit 22 is configured to remove edge information about the improper area from the edge information, based on the determined improper area, and to provide the resultant information to later processing.

The delimiting line detection unit 23 is configured to detect the delimiting line candidate Lc, which is a candidate of the delimiting line L for delimiting the parking space PS, based on the edge lines extracted by the line segment extraction unit 21. Specifically, the delimiting line detection unit 23 detects, as the delimiting line candidate Lc, a rectangular area of which edge lines substantially parallel with each other and having an interval belonging to a predetermined range corresponding to a width of the delimiting line L are set as two sides. In other words, the delimiting line detection unit 23 detects, as the delimiting line candidate Lc, a rectangular area of which a pair of edge lines corresponding to a boundary between an actual delimiting line and a road surface is set as two sides. Here, the expression "substantially parallel with each other" means that edge lines are parallel with each other with a variation of about 2°.

Figure 3:
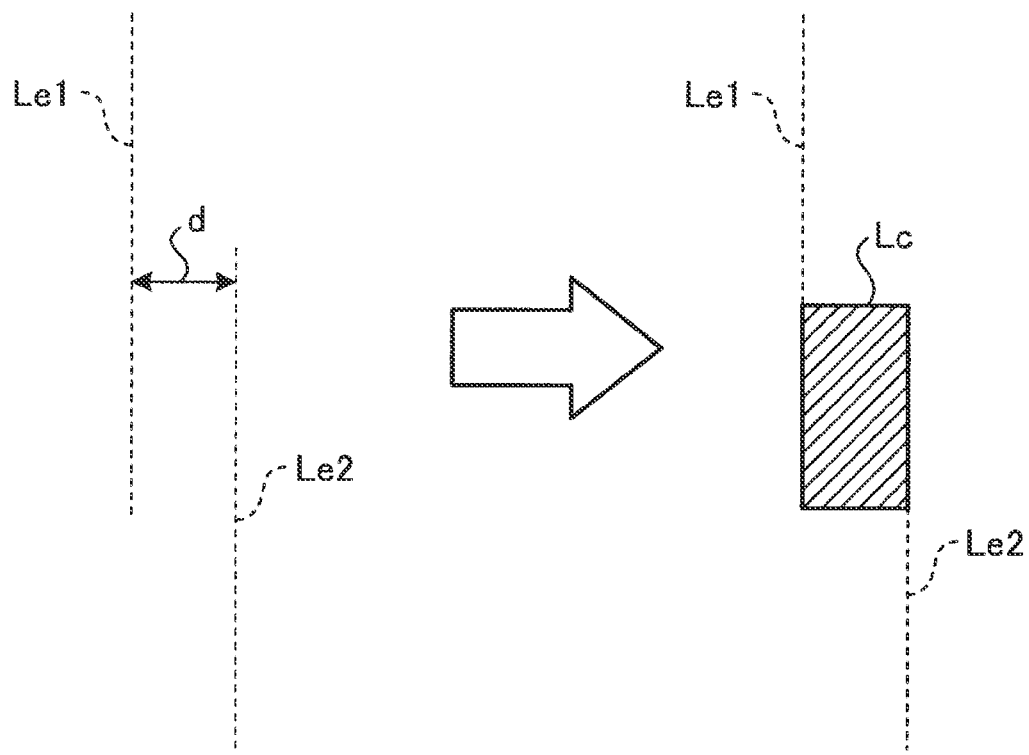
FIG. 3 depicts an example of delimiting line detection processing of the exemplary embodiment.

That is, the delimiting line detection unit 23 detects, as the delimiting line candidate Lc, a pair of edge lines corresponding to left and right ends of each delimiting line L in a width direction. FIG. 3 depicts an example of delimiting line detection processing according to the exemplary embodiment. As shown in FIG. 3, when an edge line Le1 and ab edge line Le2 are substantially parallel with each other and a distance d between the edge line Le1 and the edge line Le2 belongs to a predetermined range, the delimiting line detection unit 23 detects the delimiting line candidate Lc from the edge line Le1 and the edge line Le2.

For example, a case in which the delimiting line is a white line is described. In this case, since the luminance difference increases at a boundary between the white line and the road surface, the two edge lines substantially parallel with each other can be easily extracted. For this reason, the delimiting line detection unit 23 detects, as the delimiting line candidate Lc, the pair of the edge line Le1 and the edge line Le2 substantially parallel with each other and arranged with a predetermined interval.

Here, the predetermined range is a range corresponding to a line width of the delimiting line, and is, for example, a range of 5 cm to 10 cm. Also, as shown in FIG. 3, the delimiting line detection unit 23 detects, as the delimiting line candidate Lc, an area in which the edge line Le1 and the edge line Le2 are overlapped, and the distance d is a width of the delimiting line candidate Lc.

In other words, the delimiting line detection unit 23 does not detect, as the delimiting line candidate Lc, an area in which the edge line Le1 and the edge line Le2 are not overlapped. As described above, the reason is that a delimiting line is configured by a pair of edge lines corresponding to left and right ends of the delimiting line in the width direction.

That is, a noise is also assumed for the area in which the edge line Le1 and the edge line Le2 are not overlapped. For this reason, the delimiting line detection unit 23 does not detect, as the delimiting line candidate Lc, an area in which the edge line Le1 and the edge line Le2 are not overlapped, thereby detecting only the delimiting line candidate Lc with high accuracy. Thereby, it may be possible to suppress false detection of the parking space PS.

Returning to FIG. 2, the delimiting line detection unit 23 is configured to register the information about the delimiting line candidates Lc detected as described above in the delimiting line information 31 of the storage 3. For example, when the delimiting line candidate Lc is detected, the delimiting line detection unit 23 registers vertex coordinates of four corners of the detected delimiting line candidate Lc in the delimiting line information 31.

In the meantime, the delimiting line detection unit 23 may execute the detection processing of the delimiting line candidate Lc, except the improper area detected by the improper area determination unit 22. In other words, the delimiting line detection unit 23 does not execute the detection processing of the delimiting line candidate Lc for the improper area. Thereby, it may be possible to suppress a processing load of the control unit 2.

The exclusion determination unit 24 is configured to determine whether there is a parking-unavailable area in which the parking of the vehicle C is not permitted, based on the delimiting line candidates Lc detected by the delimiting line detection unit 23 and registered in the delimiting line information 31. For example, the exclusion determination unit 24 determines whether there is a parking-unavailable area such as a stripe area (refer to FIG. 1B), as the parking-unavailable area.

Specifically, as shown in FIG. 1B, when the plurality of parallel lines Lp adjacent to the delimiting line candidates Lc and having a predetermined angle to the delimiting line candidates Lc is detected, the exclusion determination unit 24 regards an area in which the plurality of parallel lines Lp is provided, as the stripe area Z. Here, the detection of the plurality of parallel lines Lp may be performed by the delimiting line detection unit 23.

When the parking space detection unit 25 (which will be described later) detects the parking space PS, the exclusion determination unit 24 prohibits the parking space detection unit 25 from detecting the parking space PS across the delimiting line candidates Lc adjacent to the stripe area Z. That is, the exclusion determination unit 24 sets an inside of the delimiting line candidates Lc adjacent to the stripe area Z, as the parking-unavailable area. Thereby, in the exemplary embodiment, it is possible to suppress detection of the false parking space PS across the stripe area Z.

Also, when the parking space detection unit 25 detects the parking space PS, the exclusion determination unit 24 may prohibit the parking space detection unit 25 from detecting the parking space PS across the stripe area Z. That is, the exclusion determination unit 24 may set the inside of the stripe area Z, as the parking-unavailable area. Thereby, it is possible to further suppress detection of the false parking space PS across the stripe area Z.

Also, when the three or more parallel lines Lp adjacent to the delimiting line candidates Lc and having a predetermined angle to the delimiting line candidates Lc are detected, the exclusion determination unit 24 may regard an area in which the three or more parallel lines Lp are provided, as the stripe area Z. Thereby, it is possible to suppress the exclusion determination unit 24 from falsely regarding an area in which a pair of parallel delimiting line candidates Lc is provided, as the stripe area Z.

Also, the exclusion determination unit 24 may detect each road surface marker included in the image data by matching the delimiting line candidate Lc detected by the delimiting line detection unit 23 and a template model of each road surface marker.

Also, the exclusion determination unit 24 may determine whether there is the delimiting line candidate Lc, which is not necessary to detect the parking space PS such as the road surface marker. For example, when the plurality of delimiting line candidates Lc is detected within a predetermined range in the image data, the exclusion determination unit 24 compares edge strength of the plurality of delimiting line candidates Lc.

When a difference of the edge strength of the plurality of delimiting line candidates Lc is equal to or greater than a predetermined value, the exclusion determination unit 24 may exclude the delimiting line candidate Lc having the weaker edge strength from the candidates of the delimiting line L.

When the unnecessary delimiting line candidate Lc is determined, the exclusion determination unit 24 excludes the corresponding delimiting line candidate Lc from the delimiting line information 31. Also, the exclusion determination unit 24 applies the information about the parking-unavailable area to the delimiting line information 31, and notifies the same to the parking space detection unit 25.

Returning to FIG. 2, the parking space detection unit 25 is configured to detect the parking spaces PS, based on the delimiting line candidates Lc detected by the delimiting line detection unit 23. Specifically, the parking space detection unit 25 detects, as the parking space PS, an area between the pair of delimiting line candidates Lc arranged in parallel with each other with a predetermined interval.

Here, the predetermined interval is a width of a standard parking area for general public defined by laws and the like relating to the parking lot. Also, in this case, the parking space detection unit 25 may detect the parking space PS while avoiding the area determined as the parking-unavailable area by the exclusion determination unit 24.

That is, the parking space detection unit 25 may detect the parking space PS while avoiding the delimiting line candidates Lc or the stripe area Z and the like determined as the parking-unavailable area. When the parking space detection unit 25 detects the parking space PS, it notifies parking space information about the parking space PS to the parking space managing unit 26.

In the below, the delimiting line candidate Lc used for detection as the parking space PS by the parking space detection unit 25 is referred to as 'delimiting line L'. Also, the parking space information includes the vertex coordinates of each parking space PS based on the vehicle C (i.e., the vertex coordinates of a side of the delimiting line L in contact with the parking space PS).

The parking space managing unit 26 is configured to manage the parking spaces PS detected by the parking space detection unit 25 in chronical order. The parking space managing unit 26 may estimate a moving amount of the vehicle C on the basis of the sensor values input from the sensor group Sc, and estimate the vertex coordinates of each actual parking space PS based on past parking space information, based on the moving amount.

Also, the parking space managing unit 26 may update coordinate information of the parking space PS in the past parking space information, based on the newly input parking space information. That is, the parking space managing unit 26 is configured to frequently update a relative positional relationship of the vehicle C and the parking space PS, in association with movement of the vehicle C.

Also, the parking space managing unit 26 may set a detection range of the parking space PS while assuming that a plurality of parking spaces PS is continuously arranged. For example, the parking space managing unit 26 sets one parking space PS detected by the parking space detection unit 25, as a reference, and assumes that there is a plurality of parking spaces PS continuously to the parking space PS.

The parking space managing unit 26 is configured to set positions of the assumed parking spaces PS, as a detection range. Thereby, since the line segment extraction unit 21 has only to execute the detection processing of the edge line only within the detection range set by the parking space managing unit 26, it may be possible to suppress the processing load of the control unit 2.

The stop position determination unit 27 is configured to determine a stop position upon parking of the vehicle C in the parking space PS, based on the edge lines detected by the line segment extraction unit 21. For example, the stop position determination unit 27 determines a stop position of the vehicle C by detecting a wheel block, a curbstone, a wall, a white line extending in a vehicle width direction and the like, based on the edge lines detected by the line segment extraction unit 21.

When a wheel block is detected, the stop position determination unit 27 determines a stop position so that rear wheels of the vehicle C are to be located just before the wheel block. When a white line, a wall and the like are detected, instead of the wheel block, the stop position determination unit 27 determines a stop position so that a rear end (for example, a tip end of a rear bumper) of the vehicle C is to be located just before the white line.

The storage 3 corresponds to a RAM and an HDD, for example. The RAM and the HDD can store therein a variety of information and information of diverse programs. In the meantime, the image processing device 1 may be configured to acquire the programs and diverse information through another computer connected with a wired or wireless network, or a portable recording medium.

In the delimiting line information 31, the information about the delimiting line candidates Lc detected by the delimiting line detection unit 23 is registered. For example, in the delimiting line information 31, the vertex coordinates of four corners of the detected delimiting line candidate Lc are registered.

MODIFIED EXAMPLES

Figure 4:
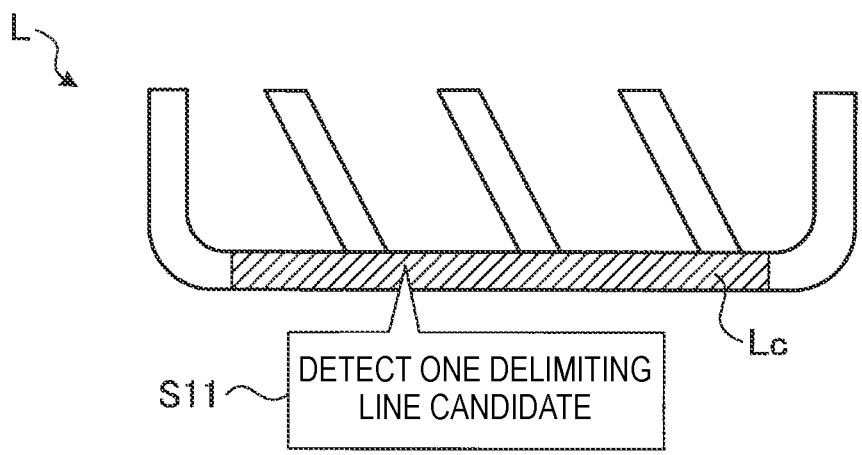
FIG. 4 illustrates details of the image processing method according to a modified example of the exemplary embodiment.
Figure 5:
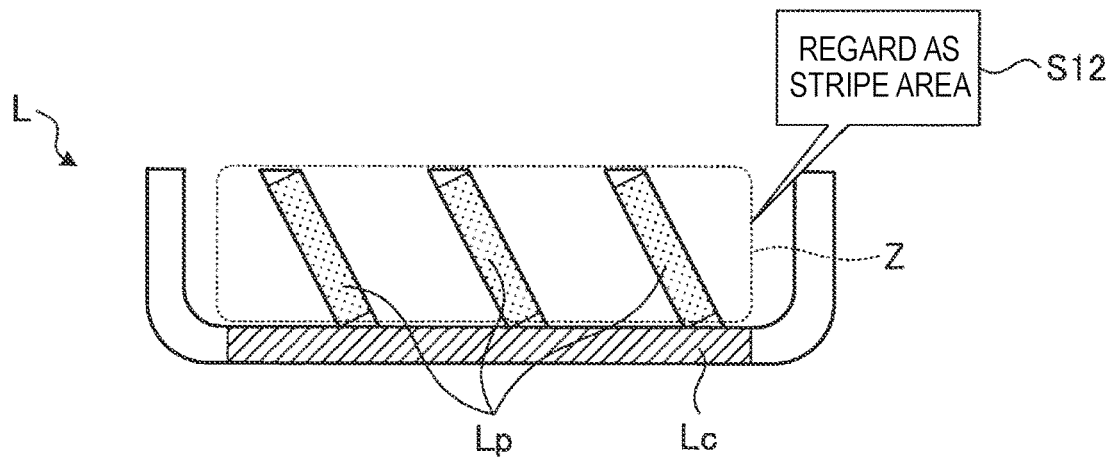
FIG. 5 illustrates details of the image processing method according to the modified example of the exemplary embodiment.
Figure 6:
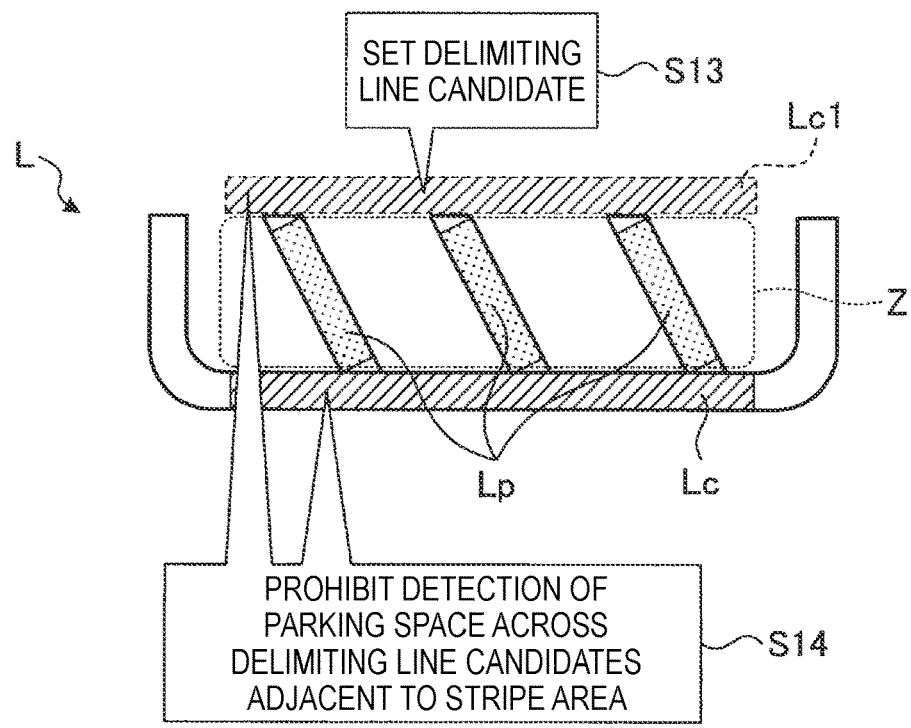
FIG. 6 illustrates details of the image processing method according to the modified example of the exemplary embodiment.

In the below, a modified examples of the image processing according to the exemplary embodiment is described with reference to FIGS. 4 to 6. FIGS. 4 to 6 illustrate details of the image processing method in accordance with the modified embodiment of the exemplary embodiment. Meanwhile, in the modified embodiment described below, an example in which the delimiting line L has a long semicircular shape, as a whole, and a plurality of parallel lines is drawn in the long semicircular shape is described.

That is, in the modified embodiment, an example in which the delimiting line candidate Lc adjacent to the plurality of parallel lines Lp is detected only on one side is described. In the meantime, the delimiting line candidate Lc on the other side, which is not detected, may not be actually drawn in the parking lot, or may not be captured by the vehicle-mounted camera 10 due to an obstacle such as other vehicle, a cone and the line.

First, as shown in FIG. 4, the exclusion determination unit 24 detects one delimiting line candidate Lc from the captured data (step S11).

Then, as shown in FIG. 5, when the plurality of parallel lines Lp adjacent to the delimiting line candidate Lc and having a predetermined angle to the delimiting line candidate Lc is detected, the exclusion determination unit 24 regards an area in which the plurality of parallel lines Lp is provided, as the stripe area Z (step S12).

Then, as shown in FIG. 6, when only one delimiting line candidate Lc adjacent to the stripe area Z is detected, the delimiting line detection unit 23 virtually sets a delimiting line candidate Lc1, which is substantially parallel with the delimiting line candidate Lc adjacent to one side of the stripe area Z and is adjacent to the other side of the stripe area Z (step S13).

The delimiting line candidate Lc1 may be set to connect end portions of the plurality of parallel lines Lp, which are opposite to the delimiting line candidate Lc adjacent to one side of the stripe area Z, for example. Also, as shown in FIG. 6, the delimiting line candidate Lc1 may have the same shape as the delimiting line candidate Lc adjacent to one side of the stripe area Z.

When the parking space detection unit 25 detects the parking space PS, the exclusion determination unit 24 prohibits detection of the parking space PS across the delimiting line candidate Lc and the delimiting line candidate Lc1 adjacent to the stripe area Z (step S14).

That is, an inside of the delimiting line candidate Lc and the delimiting line candidate Lc1 adjacent to the stripe area Z is set as the parking-unavailable area. Thereby, in the modified embodiment, even when the delimiting line candidate Lc is detected only on one side of the stripe area Z, it is possible to suppress detection of the false parking space PS across the stripe area Z.

Also, in the modified embodiment, when the parking space detection unit 25 detects the parking space PS, detection of the parking space PS across the stripe area Z may be prohibited. That is, the inside of the stripe area Z may be set as the parking-unavailable area. Thereby, in the modified embodiment, even when the delimiting line candidate Lc is detected only on one side of the stripe area Z, it is possible to further suppress detection of the false parking space PS across the stripe area Z.

Also, in the modified embodiment, the parking space detection unit 25 may detect the parking space PS, based on the delimiting line candidate Lc1 set by the delimiting line detection unit 23 and adjacent to the other side of the stripe area Z. Thereby, even when the delimiting line candidate Lc is detected only on one side of the stripe area Z, it is possible to detect the parking space PS on the other side of the stripe area Z.

<Sequence of Image Processing>

Figure 7:
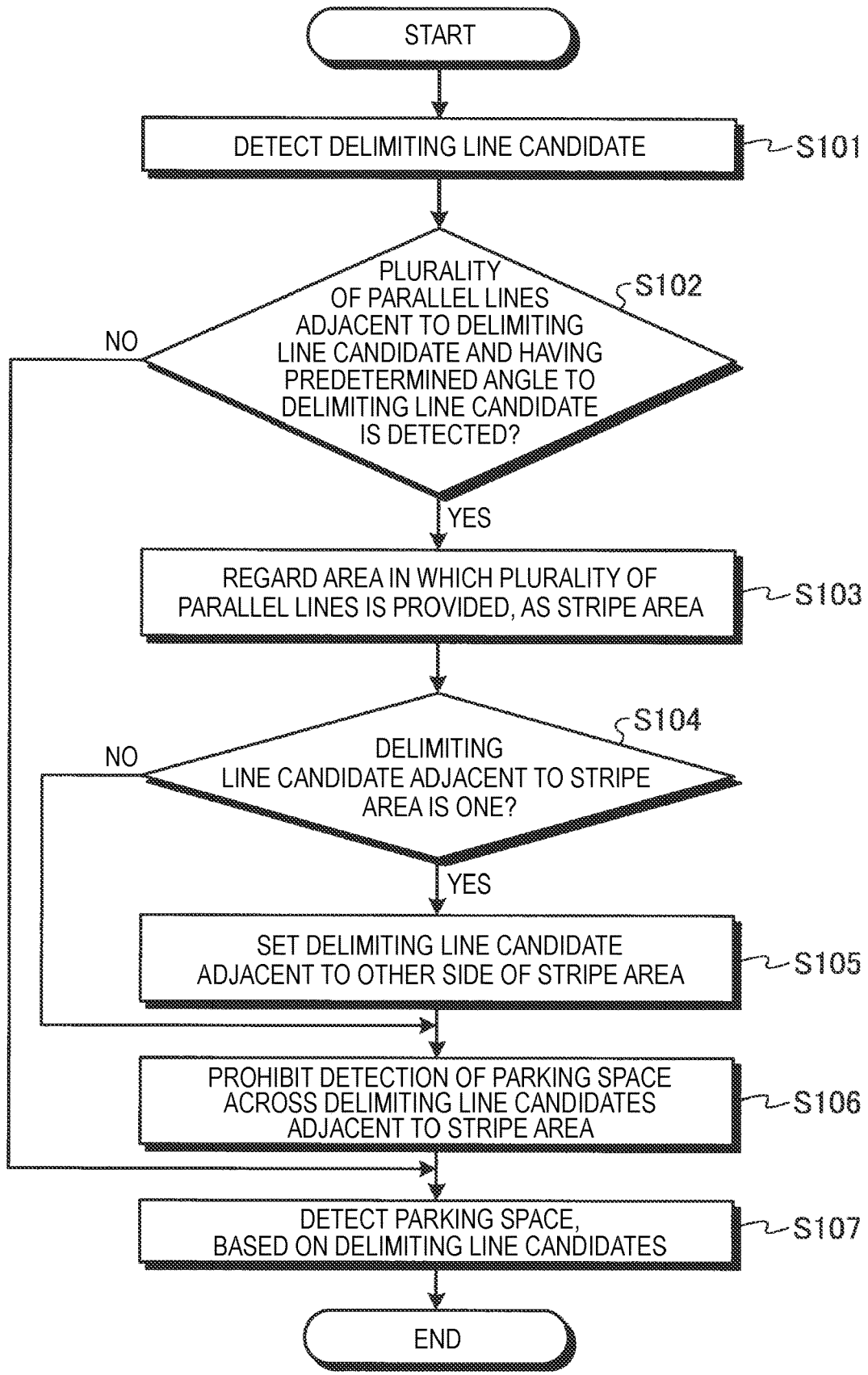
FIG. 7 is a flowchart depicting a sequence of the image processing method of the exemplary embodiment.

Subsequently, a sequence of the image processing according to the exemplary embodiment is described with reference to FIG. 7. FIG. 7 is a flowchart depicting a sequence of the image processing according to the exemplary embodiment.

First, the delimiting line detection unit 23 detects the delimiting line candidate Lc from the captured data (step S101). Then, the exclusion determination unit 24 determines whether a plurality of parallel lines Lp, which are adjacent to the delimiting line candidate Lc and have a predetermined angle to the delimiting line candidate Lc, is detected (step S102).

When it is determined that the plurality of parallel lines Lp adjacent to the delimiting line candidate Lc and having a predetermined angle to the delimiting line candidate Lc is detected (step S102, Yes), the exclusion determination unit 24 regards an area in which the plurality of parallel lines Lp is provided, as the stripe area Z (step S103).

On the other hand, when it is determined that the plurality of parallel lines Lp adjacent to the delimiting line candidate Lc and having a predetermined angle to the delimiting line candidate Lc is not detected (step S102, No), the processing proceeds to step S107, which will be described later.

Then, the exclusion determination unit 24 determines whether the delimiting line candidate Lc adjacent to the stripe area Z is one or not (step S104). When it is determined that the delimiting line candidate Lc adjacent to the stripe area Z is one (step S104, Yes), the delimiting line detection unit 23 sets the delimiting line candidate Lc1 adjacent to the other side of the stripe area Z (step S105).

Then, when the parking space detection unit 25 detects the parking space PS, the exclusion determination unit 24 prohibits detection of the parking space PS across the delimiting line candidates Lc and Lc1 adjacent to the stripe area Z (step S106).

Then, the parking space detection unit 25 detects the parking space PS, based on the delimiting line candidates Lc and Lc1 (step S107), and ends the processing.

On the other hand, when it is determined in step S104 that the delimiting line candidate Lc adjacent to the stripe area Z is not one (step S104, No), i.e., when the two delimiting line candidates Lc are adjacent to the stripe area Z, the processing proceeds to step S106.

Although the exemplary embodiment of the present disclosure has been described, the present disclosure is not limited to the exemplary embodiment, and a variety of changes can be made without departing from the gist of the present disclosure. For example, in the exemplary embodiment, the delimiting line L has an oblong shape or a long semicircular shape. However, the shape of the delimiting line L is not limited thereto.

The image processing device 1 according to the exemplary embodiment includes the delimiting line detection unit 23, the exclusion determination unit 24, and the parking space detection unit 25. The delimiting line detection unit 23 is configured to detect the delimiting line candidate Lc, which is a candidate of the delimiting line L for delimiting the parking space PS, based on the image data obtained by capturing the surrounding of the vehicle C. The exclusion determination unit 24 is configured to determine whether there is the parking-unavailable area in which the parking of the vehicle C is not permitted. The parking space detection unit 25 is configured to detect the parking space PS, based on the delimiting line candidate Lc detected by the delimiting line detection unit 23. Also, when a plurality of parallel lines Lp adjacent to the delimiting line candidate Lc and having a predetermined angle to the delimiting line candidate Lc is detected, the exclusion determination unit 24 regards an area in which the plurality of parallel lines Lp is provided, as the stripe area Z, and prohibits the parking space detection unit 25 from detecting the parking space PS across the delimiting line candidate Lc adjacent to the stripe area Z. Thereby, it is possible to suppress detection of the false parking space PS across the stripe area Z.

Also, in the image processing device 1 according to the exemplary embodiment, the exclusion determination unit 24 is configured to prohibit the parking space detection unit 25 from detecting the parking space PS across the stripe area Z. Thereby, it is possible to further suppress detection of the false parking space PS across the stripe area Z.

Also, in the image processing device 1 according to the exemplary embodiment, when only one delimiting line candidate Lc adjacent to the stripe area Z is detected, the delimiting line detection unit 23 sets the delimiting line candidate Lc1, which is substantially parallel with the delimiting line candidate Lc adjacent to one side of the stripe area Z and is adjacent to the other side of the stripe area Z. Thereby, even when the delimiting line candidate Lc is detected only on one side of the stripe area Z, it is possible to suppress detection of the false parking space PS across the stripe area Z.

Also, in the image processing device 1 according to the exemplary embodiment, the parking space detection unit 25 is configured to detect the parking space PS, based on the delimiting line candidate Le1 set by the delimiting line detection unit 2 and adjacent to the other side of the stripe area Z 3. Thereby, even when the delimiting line candidate Lc is detected only on one side of the stripe area Z, it is possible to detect the parking space PS on the other side of the stripe area Z.

Also, in the image processing device 1 according to the exemplary embodiment, when the three or more parallel lines Lp adjacent to the delimiting line candidate Lc and having a predetermined angle to the delimiting line candidate Lc are detected, the exclusion determination unit 24 regards an area in which the three or more parallel lines Lp are provided, as the stripe area Z. Thereby, it is possible to suppress an area, in which a pair of parallel delimiting line candidates Lc is provided, from being falsely regarded as the stripe area Z.

Also, the image processing method according to the exemplary embodiment includes the delimiting line detection process (step S101), the exclusion determination process (steps S102 to S106), and the parking space detection process (step S107). In the delimiting line detection process (step S101), the delimiting line candidate Lc, which is the candidate of the delimiting line L for delimiting the parking space PS, is detected based on the image data obtained by capturing the surrounding of the vehicle C. In the exclusion determination process (steps S102 to S106), it is determined whether there is the parking-unavailable area in which the parking of the vehicle C is not permitted. In the parking space detection process (step S107), the parking space PS is detected, based on the delimiting line candidate Lc detected by the delimiting line detection process (step S101). Also, in the exclusion determination process (steps S102 to S106), when the plurality of parallel lines Lp adjacent to the delimiting line candidates Lc and having a predetermined angle to the delimiting line candidates Lc is detected, the area in which the plurality of parallel lines Lp is provided is regarded as the stripe area Z (step S103), and detection of the parking space PS across the delimiting line candidate Lc adjacent to the stripe area Z in the parking space detection process (step S107) is prohibited (step S106). Thereby, it is possible to suppress detection of the false parking space PS across the stripe area Z.

The additional effects and modified embodiments can be easily deduced by one skilled in the art. For this reason, the wider aspect of the present disclosure is not limited to the specific details and exemplary embodiments as described above. Therefore, a variety of changes can be made without departing from the spirit and scope of the concept of the general invention defined by the claims and equivalents thereof.

What is claimed is:

1. An image processing device comprising:
   a processor and associated memory, the processor being configured to detect a delimiting line candidate based on image data obtained by capturing a surrounding of a vehicle, the delimiting line candidate being a candidate of a delimiting line for delimiting a parking space; determine whether there is a parking-unavailable area in which parking of the vehicle is not permitted; and detect the parking space based on the detected delimiting line candidate,
   wherein, in a case where a plurality of parallel lines that is adjacent to the delimiting line candidate and that has a predetermined angle to the delimiting line candidate is detected, the processor (i) regards an area in which the plurality of parallel lines is provided as the parking-unavailable area and (ii) prohibits the parking space across the delimiting line candidate adjacent to the parking-unavailable area from being detected.

2. The image processing device according to claim 1, wherein
   the processor is configured to prohibit the parking space across the parking-unavailable area from being detected.

3. The image processing device according to claim 1, wherein,
   in a case where a number of delimiting line candidate that is adjacent to the parking-unavailable area and that is detected is only one, the processor sets a delimiting line candidate which is substantially parallel with the detected delimiting line candidate, and
   the detected delimiting line candidate is adjacent to one side of the parking-unavailable area while the set delimiting line candidate is adjacent to another side of the parking-unavailable area.

4. The image processing device according to claim 2, wherein,
   in a case where a number of delimiting line candidate that is adjacent to the parking-unavailable area and that is detected is only one, the processor sets a delimiting line candidate which is substantially parallel with the detected delimiting line candidate, and
   the detected delimiting line candidate is adjacent to one side of the parking-unavailable area while the set delimiting line candidate is adjacent to another side of the parking-unavailable area.

5. The image processing device according to claim 3, wherein
   the processor is configured to detect the parking space based on the delimiting line candidate that is set and that is adjacent to the other side of the parking-unavailable area.

6. The image processing device according to claim 4, wherein
the processor is configured to detect the parking space based on the delimiting line candidate that is set and that is adjacent to the other side of the parking-unavailable area.

7. The image processing device according to claim 1, wherein,
in a case where a number of the parallel lines that are adjacent to the delimiting line candidate and that have the predetermined angle to the delimiting line candidate is three or more, the processor regards an area in which the three or more parallel lines are provided as the parking-unavailable area.

8. The image processing device according to claim 2, wherein,
in a case where a number of the parallel lines that are adjacent to the delimiting line candidate and that have the predetermined angle to the delimiting line candidate is three or more, the processor regards an area in which the three or more parallel lines are provided as the parking-unavailable area.

9. The image processing device according to claim 3, wherein,
in a case where a number of the parallel lines that are adjacent to the delimiting line candidate and that have the predetermined angle to the delimiting line candidate is three or more, the processor regards an area in which the three or more parallel lines are provided as the parking-unavailable area.

10. The image processing device according to claim 4, wherein,
in a case where a number of the parallel lines that are adjacent to the delimiting line candidate and that have the predetermined angle to the delimiting line candidate is three or more, the processor regards an area in which the three or more parallel lines are provided as the parking-unavailable area.

11. The image processing device according to claim 5, wherein,
in a case where a number of the parallel lines that are adjacent to the delimiting line candidate and that have the predetermined angle to the delimiting line candidate is three or more, the processor regards an area in which the three or more parallel lines are provided as the parking-unavailable area.

12. The image processing device according to claim 6, wherein,
in a case where a number of the parallel lines that are adjacent to the delimiting line candidate and that have the predetermined angle to the delimiting line candidate is three or more, the processor regards an area in which the three or more parallel lines are provided as the parking-unavailable area.

13. An image processing method comprising:

detecting a delimiting line candidate based on image data obtained by capturing a surrounding of a vehicle, the delimiting line candidate being a candidate of a delimiting line for delimiting a parking space;

determining whether there is a parking-unavailable area in which parking of the vehicle is not permitted; and detecting the parking space based on the delimiting line candidate detected, wherein the determining includes, in a case where a plurality of parallel lines that is adjacent to the delimiting line candidate and that has a predetermined angle to the delimiting line candidate is detected, regarding an area in which the plurality of parallel lines is provided as the parking-unavailable area, and prohibiting the detecting of the parking space across the delimiting line candidate adjacent to the parking-unavailable area.

* * * * *